Patented May 24, 1927.

1,629,906

UNITED STATES PATENT OFFICE.

GUILLAUME DE MONTMOLLIN AND GÉRALD BONHÔTE, OF BASEL, SWITZERLAND, ASSIGNORS TO SOCIETY OF CHEMICAL INDUSTRY IN BASLE, OF BASEL, SWITZERLAND.

STABLE DIAZO COMPOUND AND PROCESS OF MAKING SAME.

No Drawing. Application filed August 29, 1924, Serial No. 735,042, and in Switzerland September 21, 1923.

The present invention relates to new stable diazo-compounds appropriate for the production of azo-dyestuffs on the fibre. It comprises the new products as well as the process of making same.

In the specifications of our U. S. Letters Patents No. 1,453,660 and No. 1,504,437 the use of diazo-compounds of unsulfonated aryl and aralkyl ethers of o-aminophenol has been recommended for the production of dyestuffs on the fibre. It is known, however, that owing to their chemical and physical properties unsulfonated aryl and aralkyl ethers of o-aminophenols are difficult to diazotize. The production of the corresponding diazo-compounds as described in the examples of the German Patents No. 214,496 and No. 216,642 yields diazo-solutions which contain such an excess of acid that they have no practical value for the purpose indicated in our patents mentioned above.

It has now been found that by reacting with sulfonic acids of the aromatic series not containing hydroxy or amino groups, as for instance mono- and polysulfonic acids of naphthalene, on the above named diazo-compounds, same are transformed into remarkably stable derivatives, which may be isolated either by evaporation or by precipitation and be thus brought on the market in a solid form.

The new products form grains, or more or less yellow colored powders. They are very stable, easily soluble in water to yellow solutions which couple instantly and yield, when in presence of an alkaline solution of β-naphthol and by splitting off the residues of the sulfonic aromatic acids to which they were combined before, red azo-dyestuffs. Owing to these properties the new products are most valuable for the commercial production of dyestuffs on the textile fibre and their manufacture means an important progress in this branch of industry.

Example 1.

220 parts of phenyl ether of 4-chloro-2-amino-1-phenol are diazotized by means of 600 parts of hydrochloric acid, 800 parts of ice water and 160 parts of nitrite of sodium, i. e. twice the theoretical quantity required. 420 parts of the trisodium salt of naphthalene 1:3:6-trisulfonic acid are then added, while stirring, until the whole is well dissolved. The yellow solution thus obtained is filtered from slight impurities and evaporated in a vacuum, preferably at a temperature not higher than 50° C. There is thus obtained a yellow powder having properties as described in the introduction. The product is probably a mixture of the diazonium salts corresponding with the formulæ:—

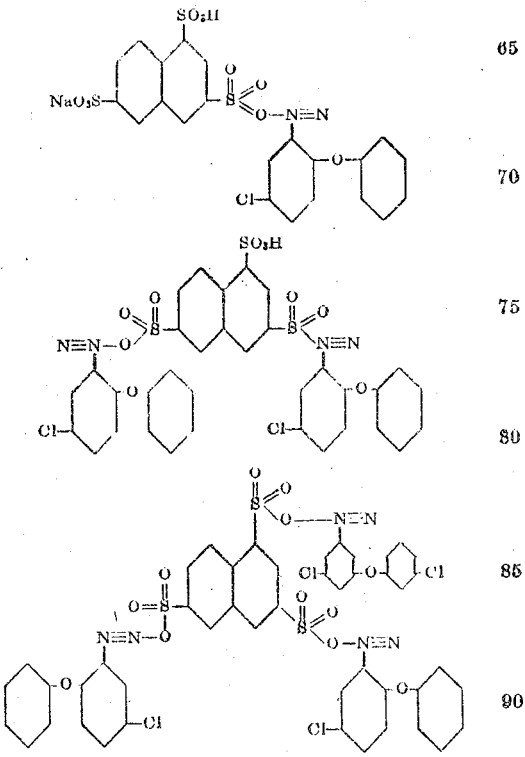

A similar product is obtained if benzyl ether of 4-chloro-2-amino-1-phenol is used instead of the corresponding phenyl ether.

Example 2.

55 parts of phenyl ether of 4-chloro-2-amino-1-phenol are diazotized as described in the foregoing example. To the filtered diazo-solution there are added 41.5 parts of disodium salt of naphthalene-2:7-disulfonic acid. A combination of two molecules of the diazo-compound with one molecule of naphthalene disulfonic acid separates, and the product thus formed is filtered after some time. This new product, which is most probably a diazonium salt corresponding with the formula:

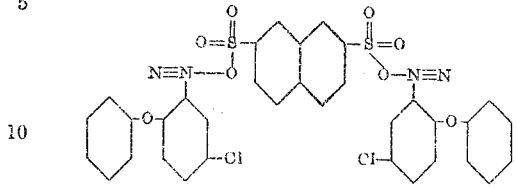

and which is soluble only with difficulty, is mixed with 40 parts of water and 120 parts of trisodium salt of naphthalene-1:3:6-trisulfonic acid, the whole being stirred until a sample dissolves easily and wholly in water. The mass is then dried in a vacuum. One may also dry the compound of two molecules of the diazo-compound with one molecule of naphthalene disulfonic acid and mix it thoroughly with 120 parts of the trisodium salt of naphthalene-1:3:6-trisulfonic acid. There is thus obtained a yellow powder which is easily soluble in water.

*Example 3.*

270 parts of benzyl ether of 4-chloro-2-amino-1-phenol, suspended in 3000 parts of iced water, are diazotized by means of 75 parts of sodium nitrite and 150 parts of hydrochloric acid. To the clear solution there are added 332 parts of disodium salt of naphthalene-2:7-disulfonic acid and the product thus obtained, which separates after some time, is filtered and dried. It forms a yellow powder rather easily soluble in water. The new product is probably a diazonium salt corresponding with the formula:

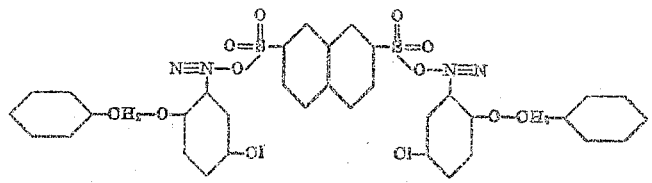

*Example 4.*

220 parts of phenyl ether of 4-chloro-2-amino-1-phenol are diazotized as described above and 225 parts of sodium salt of 3-nitrobenzene-1-sulfonic acid are added to the filtered solution of the diazo-compound. The product that separates immediately is filtered and dried. It is very probably a diazonium salt corresponding with the formula:

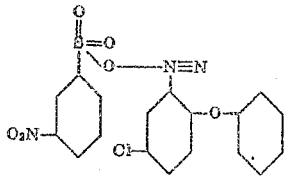

and forms a yellow powder soluble with difficulty in water, more easily in hot water.

Similar products are obtained if instead of the phenyl ether of 4-chloro-aminophenol its chlorophenyl, cresyl, chlorocresyl, naphthyle ethers etc. are employed.

The solubility of sparingly soluble products may be enhanced by addition of tri- or higher sulfonated acids of naphthalene, as has been disclosed in Example 2.

What we claim is:—

1. The process of making new stable diazo-compounds, which consists in treating diazo-derivatives of unsulfonated aryl and aralkyl ethers of o-aminophenol with sulfonic acids of the aromatic series which do not contain OH or $NH_2$ groups.

2. The process of making new stable diazo-compounds, which consists in treating diazo-derivatives of unsulfonated aryl and aralkyl ethers of o-aminophenol with sulfonic acids of naphthalene which do not contain OH or $NH_2$ groups.

3. The process of making new stable diazo-compounds, which consists in treating diazo-derivatives of unsulfonated aryl and aralkyl ethers of o-aminophenol with a disulfonic acid of naphthalene which do not contain OH or $NH_2$ groups, in isolating the product thus obtained and in mixing the latter with a trisulfonic acid of naphthalene.

4. As new products the stable diazo-compounds obtained by the action of sulfonic acids of the aromatic series which do not contain OH or $NH_2$ groups on diazo-derivatives of unsulfonated aryl and aralkyl ethers of o-aminophenol, forming more or less yellow colored powders, soluble in water to yellow solutions and yielding, if in presence of an alkaline solution of β-naphthol by splitting off the residues of sulfonated aromatic acids to which they were combined before, red azo-dyestuffs.

5. As new products the stable diazo-compounds obtained by the action of sulfonic acids of naphthalene which do not contain OH or $NH_2$ groups on diazo-derivatives of unsulfonated aryl and aralkyl ethers of o-aminophenol, forming more or less yellow colored powders, soluble in water to yellow solutions and yielding, if in presence of an alkaline solution of β-naphthol by splitting off the residues of naphthalene sulfonic acids to which they were combined before, red azo-dyestuffs, insoluble in water.

6. As new products the stable diazo-compounds obtained by the action of polysulfonic acids of naphthalene which do not contain OH or $NH_2$ groups on diazo-derivatives of unsulfonated aryl ethers of o-aminophenol, forming more or less yellow colored powders, soluble in water to yellow solutions and yielding, if in presence of an alkaline solution of $\beta$-naphthol by splitting off the residues of naphthalene polysulfonic acids to which they were combined before, red azo-dyestuffs.

7. As new products the stable diazo-compounds obtained by successive action of a disulfonic acid and a trisulfonic acid of napthalene which do not contain OH or $NH_2$ groups on diazo-derivatives of unsulfonated aryl ethers of an o-aminophenol, forming more or less yellow colored powders, soluble in water to yellow solutions and yielding, if in presence of an alkaline solution of $\beta$-naphthol by splitting off the residues of naphthalene di- and trisulfonic acids to which they were combined before, red azo-dyestuffs.

8. As a new product the stable diazo-compound obtained by successive action of a disulfonic and a trisulfonic acid of naphthalene which do not contain OH or $NH_2$ groups on diazo-derivative of the phenyl ether of the 4-chloro-2-amino-1-phenol, forming a yellow colored powder soluble in water to a yellow solution, and yielding, if in presence of an alkaline solution of $\beta$-naphthol, by splitting off the residues of the naphthalene sulfonic acids to which it was combined before, a red azo-dyestuff insoluble in water.

In witness whereof we have hereunto signed our names this 16th day of August, 1924.

GUILLAUME de MONTMOLLIN.
GÉRALD BONHÔTE.